(12) United States Patent
Kim et al.

(10) Patent No.: US 9,965,836 B2
(45) Date of Patent: May 8, 2018

(54) METHOD AND APPARATUS FOR PERFORMING FOURIER TRANSFORMATION

(71) Applicant: SAMSUNG ELECTRONICS CO., LTD., Suwon-si (KR)

(72) Inventors: Hojung Kim, Suwon-si (KR); Juwon Seo, Osan-si (KR); Hongseok Lee, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days. days.

(21) Appl. No.: 15/268,932

(22) Filed: Sep. 19, 2016

(65) Prior Publication Data

US 2017/0091916 A1  Mar. 30, 2017

(30) Foreign Application Priority Data

Sep. 30, 2015 (KR) .................. 10-2015-0138001

(51) Int. Cl.
*G06T 15/00* (2011.01)
*G06T 5/10* (2006.01)

(52) U.S. Cl.
CPC ...... *G06T 5/10* (2013.01); *G06T 2207/10004* (2013.01); *G06T 2207/20048* (2013.01)

(58) Field of Classification Search
CPC ......... G03H 2001/0833; G03H 1/0891; G03H 2210/33; G03H 1/2294; G06T 2207/20056
See application file for complete search history.

(56) References Cited

U.S. PATENT DOCUMENTS

| | | | | |
|---|---|---|---|---|
| 2009/0290203 | A1* | 11/2009 | Schwerdtner | ........ G03H 1/2294 359/9 |
| 2013/0107336 | A1 | 5/2013 | Wey et al. | |
| 2013/0222873 | A1 | 8/2013 | Kwon et al. | |
| 2015/0286186 | A1 | 10/2015 | Nam et al. | |
| 2016/0349508 | A1* | 12/2016 | Horikawa | .............. G02B 27/10 |

FOREIGN PATENT DOCUMENTS

| | | |
|---|---|---|
| JP | 2003-263094 A | 9/2003 |
| JP | 2012-8220 A | 1/2012 |
| KR | 10-2013-0086437 A | 8/2013 |
| KR | 10-2013-0096872 A | 9/2013 |
| KR | 10-2014-0125038 A | 10/2014 |

\* cited by examiner

*Primary Examiner* — Brian Werner
(74) *Attorney, Agent, or Firm* — Sughrue Mion, PLLC

(57) ABSTRACT

Provided is a method for performing a Fourier transformation for generating a computer-generated holographic (CGH) image. The method includes generating first intermediate data by performing a first FFT calculation that relates to coordinates of a pupil of a user with respect to input image data; generating second intermediate data by calculating a light concentration effect correction term for correcting a light concentration effect occurring at the pupil of the user and multiplying the first intermediate data by the light concentration effect correction term; and performing a second FFT calculation that relates to the coordinates of the pupil of the user with respect to the second intermediate data.

20 Claims, 10 Drawing Sheets

FIG. 4

$$G(x_1, y_1) = \frac{(j)(j)}{(\lambda d_2)(\lambda d_2)} e^{-j\frac{\pi}{\lambda d_1}(x_1^2+y_1^2)} \iint \underbrace{e^{-j\frac{\pi}{\lambda}(\frac{1}{d_1}+\frac{1}{d_2}-\frac{1}{f})(u^2+v^2)}}_{P2} e^{j\frac{2\pi}{\lambda d_1}(ux_1+vy_1)} \underbrace{\left[\iint e^{-j\frac{\pi}{\lambda d_2}(x_2^2+y_2^2)} F(x_2, y_2) e^{j\frac{2\pi}{\lambda d_2}(x_2 u+y_2 v)} dx_2 dy_2\right]}_{P1} dudv$$

P3

METHOD AND APPARATUS FOR PERFORMING FOURIER TRANSFORMATION

CROSS-REFERENCE TO RELATED APPLICATION

This application claims priority from Korean Patent Application No. 10-2015-0138001, filed on Sep. 30, 2015, in the Korean Intellectual Property Office, the disclosure of which is incorporated herein by reference in its entirety.

BACKGROUND

1. Field

Exemplary embodiments relate to a method and an apparatus for performing Fourier transformation for generating a CGH image.

2. Description of the Related Art

Recently, many techniques related to 3D images are being researched. Research is being actively made on apparatuses for embodying high-quality holograms in real time by using complex spatial light modulators (SLMs) capable of simultaneously controlling an amplitude and a phase of light.

A computer-generated hologram (CGH) is used to reproduce hologram moving pictures. A holographic image processing apparatus calculates hologram values regarding respective locations on a hologram plane, where amounts of the calculations are massive. In this aspect, it is necessary for a holographic image processing apparatus to perform a Fourier transformation once to display a single point in a space. In other words, it is necessary to perform Fourier transformations for a number of times identical to a number of pixels to display a spatial image.

A holographic image processing apparatus, such as a TV or a mobile device, may process input image data to reproduce hologram images. In this case, the holographic image processing apparatus may perform a Fourier transformation with respect to the input image data and reproduce images by using the transformed input image data.

A Fourier transformation performed by a holographic image processing apparatus requires relatively large amounts of calculations and a relatively long time period. In particular, portable devices, such as a mobile device, are limited in size and usable power. Therefore, methods for reducing amounts of calculations and time period therefor are demanded.

SUMMARY

Provided are methods and apparatuses for reducing amounts of calculations for a Fourier transformation for generating a computer-generated hologram (CGH) image.

Provided are methods and apparatuses for reducing capacity of a memory used for performing a Fourier transformation.

Provided are non-transitory computer readable recording media having recorded thereon computer programs for implementing the methods.

Additional aspects will be set forth in part in the description which follows and, in part, will be apparent from the description, or may be learned by practice of the presented exemplary embodiments.

According to an aspect of an exemplary embodiment, a method of performing a Fourier transformation for generating a computer-generated hologram (CGH) image, the method includes generating first intermediate data by performing a first fast Fourier transform (FFT) calculation regarding coordinates of a pupil of a user with respect to input image data; generating second intermediate data by calculating a light concentration effect correction term for correcting a light concentration effect occurring at the pupil of the user and multiplying the first intermediate data by the light concentration effect correction term; and performing a second FFT calculation regarding the coordinates of the pupil of the user with respect to the second intermediate data, wherein the generating of the second intermediate data includes forming a reference table by calculating the light concentration effect correction term with respect to a single period of period variable values that periodically change the light concentration effect correction term; calculating the period variable value at the coordinates of the pupil of the user corresponding to the first FFT calculation; and invoking the light concentration effect correction term value corresponding to the period variable value calculated at the pupil of the user.

The light concentration effect correction term value may depend on the coordinates of the pupil of the user.

The light concentration effect correction term value may be determined according to Equation 1 below:

$$C(u, v) = e^{-j\frac{\pi}{\lambda}\left(\frac{1}{d_1}+\frac{1}{d_2}-\frac{1}{f}\right)(u^2+v^2)}$$

(u denotes a horizontal coordinate of the pupil of the user, v denotes a vertical coordinate of the pupil of the user, C(u, v) denotes a light concentration effect correction term, λ denotes wavelength of light, $d_1$ denotes a distance between a holographic display apparatus and the pupil of the user, $d_2$ denotes a distance between the holographic display apparatus and the retina of the user, and f denotes a focal length of a lens inside the holographic display apparatus).

The period variable may be a result value of a nonlinear function of the horizontal coordinate u of the pupil and the vertical coordinate v of the pupil.

The period variable may be $u^2+v^2$.

In the forming of the reference table, period variables and light concentration effect correction terms may be calculated on a straight line on a (u, v) plane by changing values of u and v, and the period variables and the light concentration effect correction terms may be stored in the reference table (u denotes a horizontal coordinate of the pupil of the user, and v denotes a vertical coordinate of the pupil of the user).

In the forming of the reference table, the period variables and the light concentration effect correction terms may be calculated on a segment interconnecting the point of origin and an arbitrary point satisfying $$u^2 + v^2 = \frac{2d_1 d_2 \lambda f}{d_1 f + d_2 f - d_1 d_2}$$

on a (u, v) plane by changing values of u and v and are stored in the reference table.

In the invoking of the light concentration effect correction term, a remainder may be obtained by dividing the period variable calculated at the coordinates of the pupil of the user by the single period value, and the light concentration effect correction term corresponding to a period variable closest to the remainder from among the period variables stored in the reference table may be invoked.

The period variable may be determined as $u'^2+v'^2$ at the coordinates $(u', v')$ of the pupil of the user corresponding to the first FFT calculation, and the single period value may be determined as $$\frac{2d_1 d_2 \lambda f}{d_1 f + d_2 f - d_1 d_2}$$

($u'$ denotes a horizontal coordinate corresponding to a first FFT calculation, $v'$ denotes a vertical coordinate corresponding to a first FFT calculation, $\lambda$ denotes wavelength of light, $d_1$ denotes a distance between a holographic display apparatus and the pupil of the user, $d_2$ denotes a distance between the holographic display apparatus and the retina of the user, and f denotes a focal length of a lens inside the holographic display apparatus).

According to another aspect of an exemplary embodiment, there is provided a non-transitory computer readable recording medium having recorded thereon a computer program for implementing the method of performing a Fourier transformation.

According to an aspect of an exemplary embodiment, an apparatus for performing a Fourier transformation for generating a CGH image, the apparatus includes a first FFT calculator that generates first intermediate data by performing a first FFT calculation regarding a pupil of a user with respect to input image data; a light concentration effect correction term calculator that generates second intermediate data by calculating a light concentration effect correction term for correcting a light concentration effect occurring at the pupil of the user and multiplying the first intermediate data by the light concentration effect correction term; and a second FFT calculator that performs a second FFT calculation regarding the coordinates of the pupil of the user with respect to the second intermediate data, wherein the second FFT calculator forms a reference table by calculating the light concentration effect correction term with respect to a single period of period variable values that periodically change the light concentration effect correction term, calculates the period variable value at the coordinates of the pupil of the user corresponding to the first FFT calculation, and invokes the light concentration effect correction term value corresponding to the period variable value calculated at the pupil of the user.

The light concentration effect correction term value may depend on the coordinates of the pupil of the user.

The light concentration effect correction term value may be determined according to Equation 1 below:

$$C(u, v) = e^{-j\frac{\pi}{\lambda}\left(\frac{1}{d_1}+\frac{1}{d_2}-\frac{1}{f}\right)(u^2+v^2)}$$

(u denotes a horizontal coordinate of the pupil of the user, v denotes a vertical coordinate of the pupil of the user, $C(u, v)$ denotes a light concentration effect correction term, $\lambda$ denotes wavelength of light, $d_1$ denotes a distance between a holographic display apparatus and the pupil of the user, $d_2$ denotes a distance between the holographic display apparatus and the retina of the user, and f denotes a focal length of a lens inside the holographic display apparatus).

The period variable may be a result value of a nonlinear function of the horizontal coordinate u of the pupil and the vertical coordinate v of the pupil.

The period variable may be $u^2+v^2$.

The light concentration effect correction term calculator calculates period variables and light concentration effect correction terms on a straight line on a (u, v) plane by changing values of u and v and stores the period variables and the light concentration effect correction terms in the reference table (u denotes a horizontal coordinate of the pupil of the user, and v denotes a vertical coordinate of the pupil of the user).

The light concentration effect correction term calculator may calculate the period variables and the light concentration effect correction terms on a segment interconnecting the point of origin and an arbitrary point satisfying $$u^2 + v^2 = \frac{2d_1 d_2 \lambda f}{d_1 f + d_2 f - d_1 d_2}$$

on a (u, v) plane by changing values of u and v and store the period variables and the light concentration effect correction terms in the reference table.

The light concentration effect correction term calculator may obtain a remainder by dividing the period variable calculated at the coordinates of the pupil of the user by the single period value and invoke the light concentration effect correction term corresponding to a period variable closest to the remainder from among the period variables stored in the reference table.

The period variable may be determined as $u'^2+v'^2$ at the coordinates $(u', v')$ of the pupil of the user corresponding to the first FFT calculation, and the single period value may be determined as $$\frac{2d_1 d_2 \lambda f}{d_1 f + d_2 f - d_1 d_2}$$

($u'$ denotes a horizontal coordinate corresponding to a first FFT calculation, $v'$ denotes a vertical coordinate corresponding to a first FFT calculation, $\lambda$ denotes wavelength of light, $d_1$ denotes a distance between a holographic display apparatus and the pupil of the user, $d_2$ denotes a distance between the holographic display apparatus and the retina of the user, and f denotes a focal length of a lens inside the holographic display apparatus).

BRIEF DESCRIPTION OF THE DRAWINGS

These and/or other aspects will become apparent and more readily appreciated from the following description of exemplary embodiments, taken in conjunction with the accompanying drawings in which:

FIG. 4 is a diagram showing the calculation parts of Equation 1;

In FIG. 7, the horizontal axis indicates values of $u^2+v^2$, which are result values of nonlinear function of u and v;

DETAILED DESCRIPTION

Figure 1:
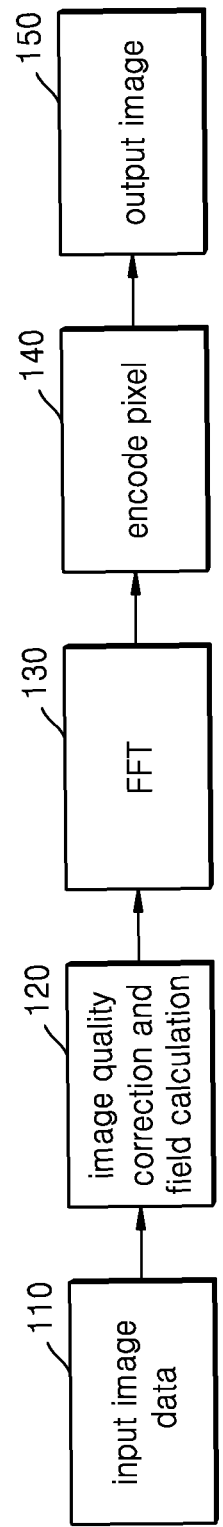
FIG. 1 is a flowchart showing a method for processing a holographic image.

In addition, although the terms used in the present specification are selected from generally known and used terms, some of the terms mentioned in the description of the present specification have been selected by the applicant at his or her discretion, the detailed meanings of which are described in relevant parts of the description herein. Furthermore, it is required that the present specification is understood, not simply by the actual terms used but by the meaning of each term lying within.

Throughout the specification, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components. In addition, the terms "-er", "-or", and "module" described in the specification mean units for processing at least one function and operation and can be implemented by hardware components or software components and combinations thereof.

While such terms as "first," "second," etc., may be used to describe various components, such components must not be limited to the above terms. The above terms are used only to distinguish one component from another.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

FIG. 1 is a flowchart showing a method for processing a holographic image. Referring to FIG. 1, a holographic image processing apparatus may receive input image data and output a holographic image. The input image data may be data regarding input images captured in advance. Alternatively, the input image data may be data regarding virtually created input images (e.g., animation images). The input image data may include any of a two-dimensional (2D) image and color data and depth data regarding pixels of the 2D image. In another example, the input image data may include polygon data or three-dimensional (3D) voxel data.

In operation 110, the holographic image processing apparatus receives input image data. For example, in case of applying a layer-based algorithm to input image data during a computer-generated holographic (CGH) calculation, the input image data may be color data or depth data. The color data may be data indicating a plurality of colors per plane. The layer-based algorithm is an algorithm for dividing a hologram playback region into planes by depths and processing data regarding each of the planes. The holographic image processing apparatus may generate a holographic image by performing a Fourier transformation or an inverse Fourier transformation with respect to data that relates to each of the respective planes.

In operation 120, the holographic image processing apparatus performs an image quality correction and a field calculation. The holographic image processing apparatus may correct input image data to improve image quality of the input image data.

In operation 130, the holographic image processing apparatus performs a Fourier transformation or an inverse Fourier transformation.

The holographic image processing apparatus may include a plurality of cores, where each of the plurality of cores may perform a respective Fourier transformation with respect to input image data in parallel. For example, the holographic image processing apparatus may respectively allocate input image data from the plurality of planes to the plurality of cores, and the plurality of cores perform Fourier transforms to the allocated input image data.

The process by which the holographic image processing apparatus performs a Fourier transformation with respect to input image data will be described below in detail with reference to FIGS. 2 to 9.

As a result of a fast Fourier transform (FFT) calculation, complex numbers corresponding to respective pixels of input image data may be obtained. The complex numbers regarding pixels may include information regarding amplitudes and phases on a diffraction pattern. The holographic image processing apparatus may generate a complex array from the complex numbers. The complex array is an array which includes complex numbers and may be a 2D array or a 3D array. However, an array dimension of the complex array may be another arbitrary dimension.

In operation 140, the holographic image processing apparatus performs a pixel encoding operation. The holographic image processing apparatus generates data to be input to a display screen by performing the pixel encoding operation. Data to be input to a display screen may include information regarding phases and amplitudes of modulated light for generating an holographic image.

In operation 150, the holographic image processing apparatus may output an image to an image display apparatus.

Figure 2:
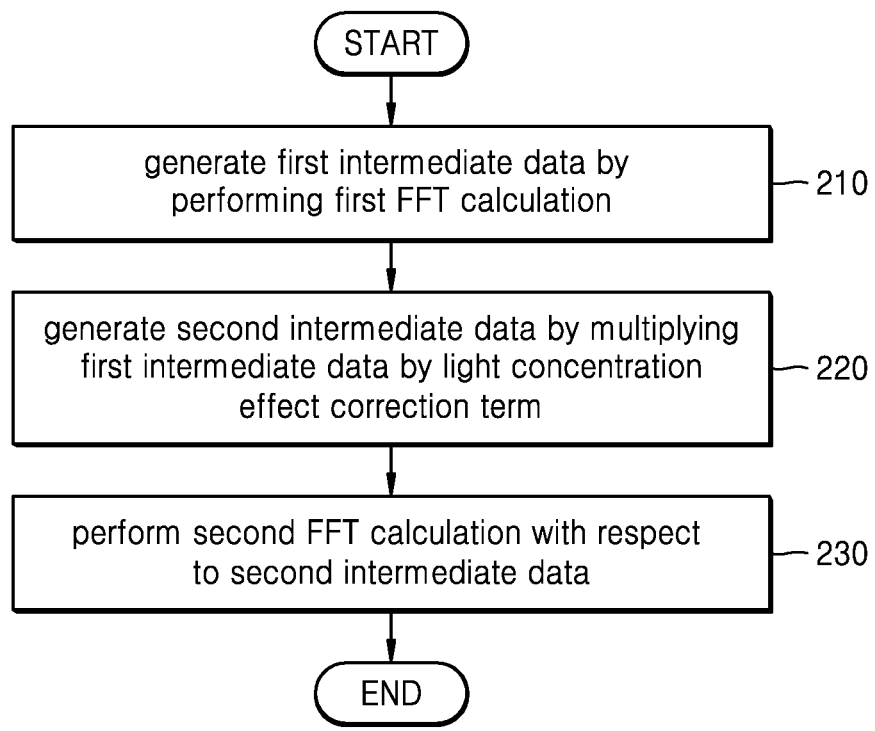
FIG. 2 is a flowchart showing a method for performing a Fourier transformation, according to an exemplary embodiment.

FIG. 2 is a flowchart showing a method of performing a Fourier transformation, according to an exemplary embodiment. A calculation result obtained by using the method of performing a Fourier transformation shown in FIG. 2 may be used for generating a CGH image.

Referring to FIG. 2, the method of performing a Fourier transformation according to an exemplary embodiment may include an operation 210 for generating first intermediate data by performing a first FFT calculation that relates to coordinates of a retina of a user with respect to input image data, an operation 220 for generating second intermediate data by calculating a light concentration effect correction term for correcting a light concentration effect occurring at a pupil of the user and multiplying the first intermediate data by the light concentration effect correction term, and an operation 230 for performing a second FFT calculation that relates to the coordinates of pupils of the user with respect to the second intermediate data.

Hereinafter, the method of performing a Fourier transformation shown in FIG. 2 will be described with reference to Equation 1 below. Equation 1 is merely an example, and the exemplary embodiments are not limited thereto. For example, some terms may be added to or removed from Equation 1, and/or other weight factors to be multiplied by various terms may be applied thereto. For example, the operations 210, 220, and 230 shown in FIG. 2 may perform calculations shown in Equation 1.

$$G(x_1, y_1) = \frac{(j)(j)}{(\lambda d_2)(\lambda d_2)} e^{-j\frac{\pi}{\lambda d_1}(x_1^2+y_1^2)}$$
$$\int\int \left[ e^{-j\frac{\pi}{\lambda}(\frac{1}{d_1}+\frac{1}{d_2}-\frac{1}{f})(u^2+v^2)} e^{j\frac{2\pi}{\lambda d_1}(ux_1+vy_1)} \right.$$
$$\left. \int\int e^{-j\frac{\pi}{\lambda d_2}(x_2^2+y_2^2)} F(x_2, y_2) e^{j\frac{2\pi}{\lambda d_2}(x_2u+y_2v)} dx_2 dy_2 \right] dudv$$

[Equation 1]

In Equation 1, $x_2$ denotes a horizontal coordinate of a retina of a user, $y_2$ denotes a vertical coordinate of the retina of the user, u denotes a horizontal coordinate of a pupil of the user, v denotes a vertical coordinate of the pupil of the user, $x_1$ denotes a horizontal coordinate of a display panel of a holographic image processing apparatus, and $y_1$ denotes a vertical coordinate of the display panel of the holographic image processing apparatus. Furthermore, λ denotes a wavelength of light, $d_1$ denotes a distance between a holographic display apparatus and the pupil of the user, $d_2$ denotes a distance between the holographic display apparatus and the retina of the user, and f denotes a focal length of a lens inside the holographic display apparatus.

In Equation 1, the function $F(x_2, y_2)$ denotes a complex number function indicating phase and amplitude of modulated light incident at coordinates $(x_2, y_2)$ of the pupil of the user. The function $F(x_2, y_2)$ may vary according to a holographic image to be displayed. In other words, the function $F(x_2, y_2)$ may vary according to input image data input to the holographic image processing apparatus. Furthermore, a complex number function $G(x_1, y_1)$ denotes a complex number function indicating a phase and an amplitude of modulated light at a coordinate $(x_1, y_1)$ of the display panel.

Figure 3:
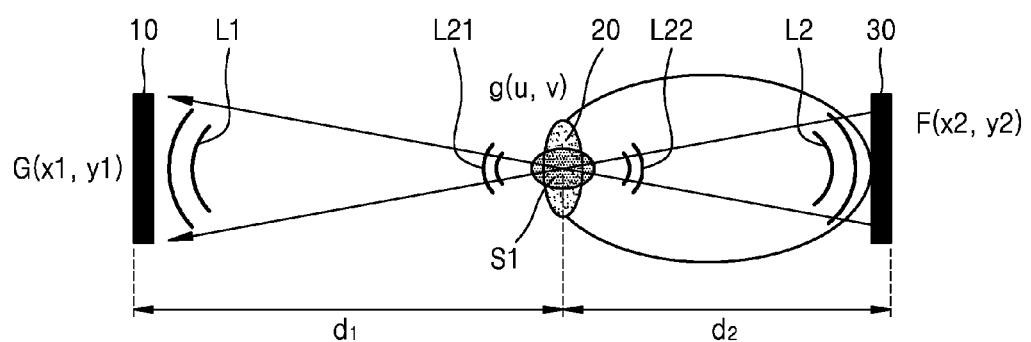
FIG. 3 is a diagram schematically showing that modulated light emitted by a display panel of a holographic image processing apparatus reaches a pupil and a retina of a user to help understanding of the variables shown in Equation 1.

FIG. 3 is a diagram schematically showing that modulated light emitted by a display panel 10 of a holographic image processing apparatus reaches a pupil 20 and a retina 30 of a user to help understanding of the variables shown in Equation 1.

Referring to FIG. 3, modulated light L1 may be emitted by the display panel 10. Phase and amplitude of the modulated light L1 may vary according to coordinates $(x_1, y_1)$ of the display panel 10. The complex number function G $(x_1, y_1)$ indicates information regarding a phase and an amplitude of modulated light at the coordinates $(x_1, y_1)$ of the display panel 10. The pupil 20 of the user has a spherical or curved surface. Therefore, modulated light may be concentrated at the interior S1 of the pupil 20. As a result, information regarding an amplitude and a phase of light L21 incident to the pupil 20 may be different from information regarding an amplitude and a phase of light L22 emitted from the pupil 20. The above-stated light concentration effect correction term is introduced to correct the difference. Detailed descriptions thereof will be provided below with reference to FIG. 4.

Modulated light that propagates through the pupil 20 may be incident to the retina 30 of the user. The complex number function $F(x_2, y_2)$ indicates information regarding an amplitude and a phase of light L2 incident to the retina 30 of the user. The user recognizes a holographic image from the amplitude and the phase of the light L2 incident to the retina 30 of the user. In other words, a holographic image recognized by the user may be determined based on the complex number function $F(x_2, y_2)$.

The complex number function $F(x_2, y_2)$ may be determined based on input image data, because the phase and the amplitude of modulated light incident to the coordinate $(x_2, y_2)$ of the retina 30 of the user may be determined based on the input image data. When the complex number function $F(x_2, y_2)$ is determined, the holographic image processing apparatus may obtain the complex number function $G(x_1, y_1)$ via a Fourier transformation as shown in Equation 1. In other words, information regarding the phase and the amplitude of modulated light emitted at the coordinates $(x_1, y_1)$ of the display panel 10 may be obtained from the input image data. When the phase and the amplitude of modulated light emitted at the coordinates $(x_1, y_1)$ of the display panel 10 are determined, the holographic image processing apparatus may adjust a diffraction pattern of the display panel 10, such that modulated light having the phase and the amplitude is emitted from the display panel 10.

FIG. 4 is a diagram showing three calculation parts of Equation 1.

Referring to FIG. 4, Equation 1 may be divided into a first FFT calculation part P1 regarding coordinates of a retina of a user, a calculation part P2 for obtaining a light concentration effect correction term that multiplies a result of the first FFT calculation part P1, and a second FFT calculation part P3 regarding coordinates of a pupil of the user. For example, the calculation part P1 of FIG. 3 may be performed in the operation 210 of FIG. 2. Furthermore, the calculation part P2 of FIG. 3 may be performed in the operation 220 of FIG. 2. Furthermore, the calculation part P3 of FIG. 3 may be performed in the operation 230 of FIG. 2.

Referring to FIGS. 2, 3, and 4, in the operation 210, a holographic image processing apparatus may perform a first FFT calculation with respect to a complex number function $F(x_2, y_2)$ obtained from input image data. The first FFT calculation may be performed via a Fourier transformation with respect to the coordinates $(x_2, y_2)$ of the retina of the user. First intermediate data may be obtained by performing the first FFT calculation. The first intermediate data may include information regarding the amplitude and the phase of light L22 emitted by the pupil 20 in FIG. 3.

As described above, due to the light concentration effect of the pupil 20, the amplitude and the phase of the light L22 emitted by the pupil 20 may be different from the phase and the amplitude of incident light L21. The light concentration effect of the pupil 20 may be offset by multiplying the first intermediate data by the light concentration effect correction term.

In the operation 220, the holographic image processing apparatus may calculate the light concentration effect correction term and generate second intermediate data by multiplying the first intermediate data by the light concentration effect correction term. The light concentration effect correction term may be a calculation result of the calculation part P2 shown in FIG. 4. However, since the calculation part P2 does not include an integral calculation, a reference table may be used instead of directly performing the calculation part P2. In this aspect, considering that the calculation part P2 includes a complicated complex number calculation, time and resources for performing the calculation part P2 may be reduced by appropriately utilizing a reference table. Here, the smaller the reference table is, the more efficient the calculation of the calculation part P2 may become. Detailed descriptions thereof will be provided below with reference to FIGS. 5 to 9.

In operation 230, the holographic image processing apparatus may obtain a result of a Fourier transformation by performing second FFT calculation with respect to the second intermediate data. Here, the second FFT calculation may correspond to the calculation part P3 shown in FIG. 3. The calculation part P3 may include a Fourier transformation regarding coordinates (u, v) of a pupil of the user.

Hereinafter, an operation for efficiently calculating a light concentration effect correction term by using a reference table in the operation 220 will be described.

Figure 5:
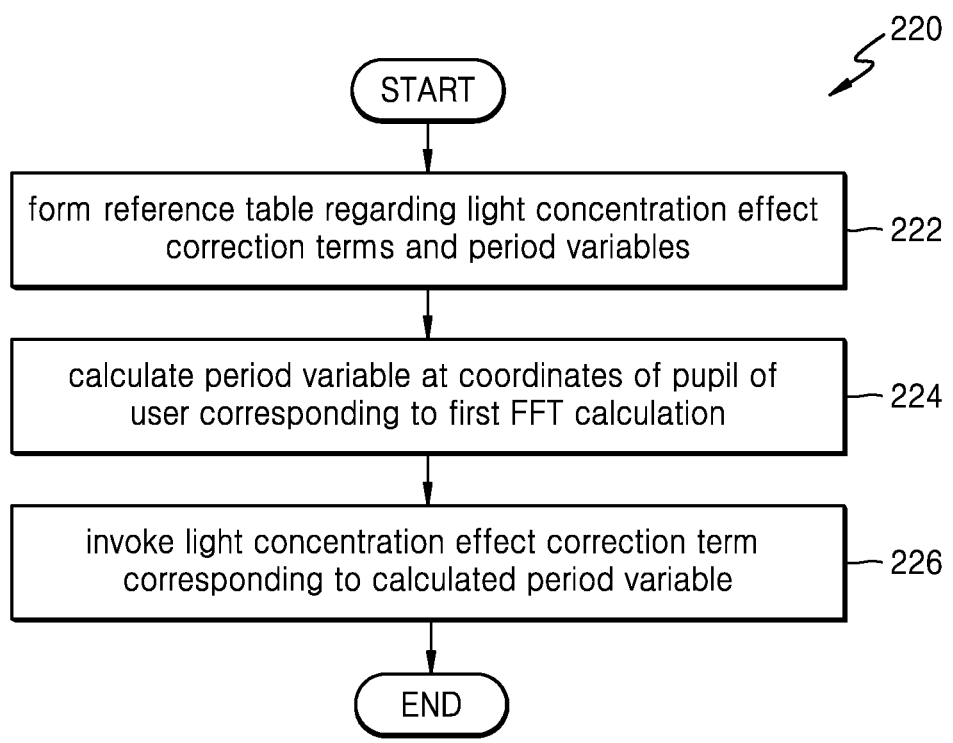
FIG. 5 is a flowchart showing an example of sequences that a holographic image processing apparatus operates in the operation 220 shown in FIG. 2.

FIG. 5 is a flowchart showing an example of sequences that the holographic image processing apparatus executes in the operation 220 shown in FIG. 2.

Referring to FIG. 5, the operation 220 may include an operation 222 for forming a reference table by calculating the light concentration effect correction term with respect to a single period of a period variable that periodically changes the light concentration effect correction term, i.e., a variable that has a regular periodicity.

Since the calculation part P2 corresponding to a calculation of the light concentration effect correction term includes an exponential function, the light concentration effect correction term, which is a result of the calculation part P2, may be periodically changed by a particular variable. Therefore, in the present specification, a variable that periodically changes a light concentration effect correction term is referred to as a 'period variable.'

Since the light concentration effect correction term varies based on the coordinates (u, v) of the pupil of the user, the period variable may also be a result value of a function of u and v.

Figure 6:
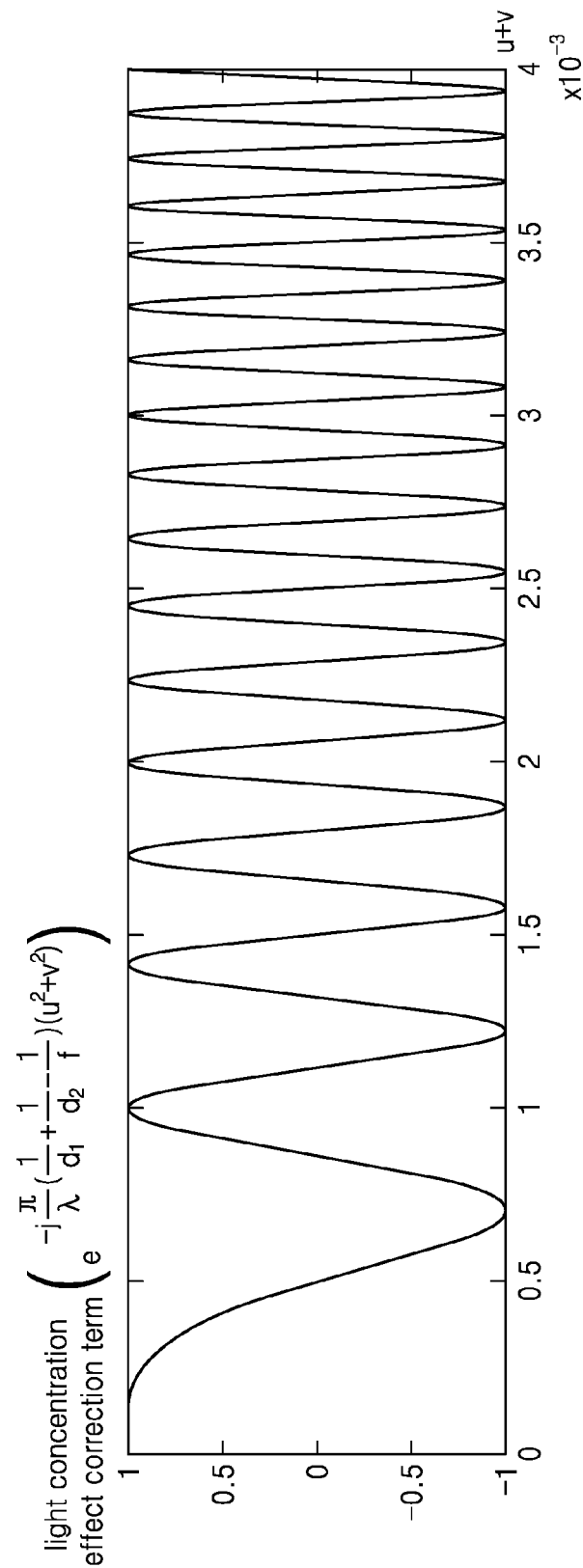
FIG. 6 is a graph showing a change of values of a light concentration effect correction term according to a change in the result values of the linear function of u and v.

FIG. 6 is a graph showing a change of values of a light concentration effect correction term according to a change in the result value of the linear function of u and v. In FIG. 6, the horizontal axis indicates values of u+v, which are the result values of the linear function of u and v.

Referring to FIG. 6, the light concentration effect correction term irregularly varies as a u+v value varies. The reason for this is that $u^2+v^2$ in the exponential term of the calculation part P2 is a result value of a nonlinear function of u and v. Therefore, a linear function value regarding u and v may be inappropriate as the period variable.

Figure 7:
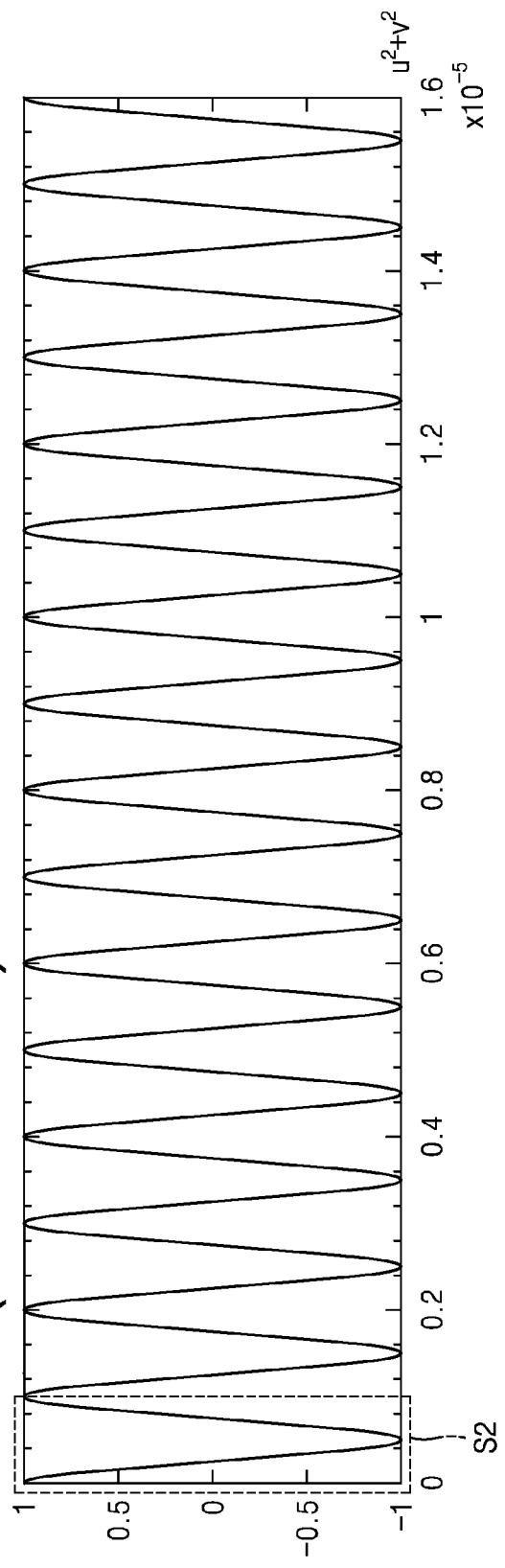
FIG. 7 is a graph showing a change of values of a light concentration effect correction term according to a change in the result values of non-linear function of u and v.

FIG. 7 is a graph showing a change of values of a light concentration effect correction term according to a change in the result of non-linear function of u and v. In FIG. 7, the horizontal axis indicates values of $u^2+v^2$, which are result values of a nonlinear function of u and v.

Referring to FIG. 7, as a value of $u^2+v^2$ varies, a value of the light concentration effect correction term varies periodically, i.e., with a regular periodicity. The reason for this is that the exponential term of the calculation part P2 is directly proportional to $u^2+v^2$. Therefore, $u^2+v^2$ or an arbitrary multiple of $u^2+v^2$ may be used as the period variable.

In the operation 222, a holographic image processing apparatus may calculate the light concentration effect correction term by varying the period variable. Furthermore, the holographic image processing apparatus may store a change of the light concentration effect correction term according to the change of the period variable in a reference table. Here, since the light concentration effect correction term varies periodically according to a variation of the period variable, the holographic image processing apparatus may not store values of the light concentration effect correction term regarding all values of the period variable in the reference table. For example, the holographic image processing apparatus may store change of values of the light concentration effect correction term corresponding to the first period only in a region S2 of FIG. 7 in the reference table. Therefore, size of the reference table may be reduced. Furthermore, a time period for invoking data from the reference table may be reduced.

In the operation 222, the holographic image processing apparatus may calculate period variables and light concentration effect correction terms regarding a plurality of coordinates (u, v) of pupils and store the period variables and the light concentration effect correction terms in the reference table. Here, the plurality of coordinates (u, v) of pupils may be selected in any one of various manners.

For example, the plurality of coordinates (u, v) of pupils may be selected with respect to a straight line. In other words, the holographic image processing apparatus may calculate period variables and light concentration effect correction terms on a straight line on a (u, v) plane by varying values of u and v and store the period variables and the light concentration effect correction terms in the reference table. Since a period variable $u^2+v^2$ may be varied monotonically on a straight line, period variables and light concentration effect correction terms for a reference table may be easily obtained.

Figure 8:
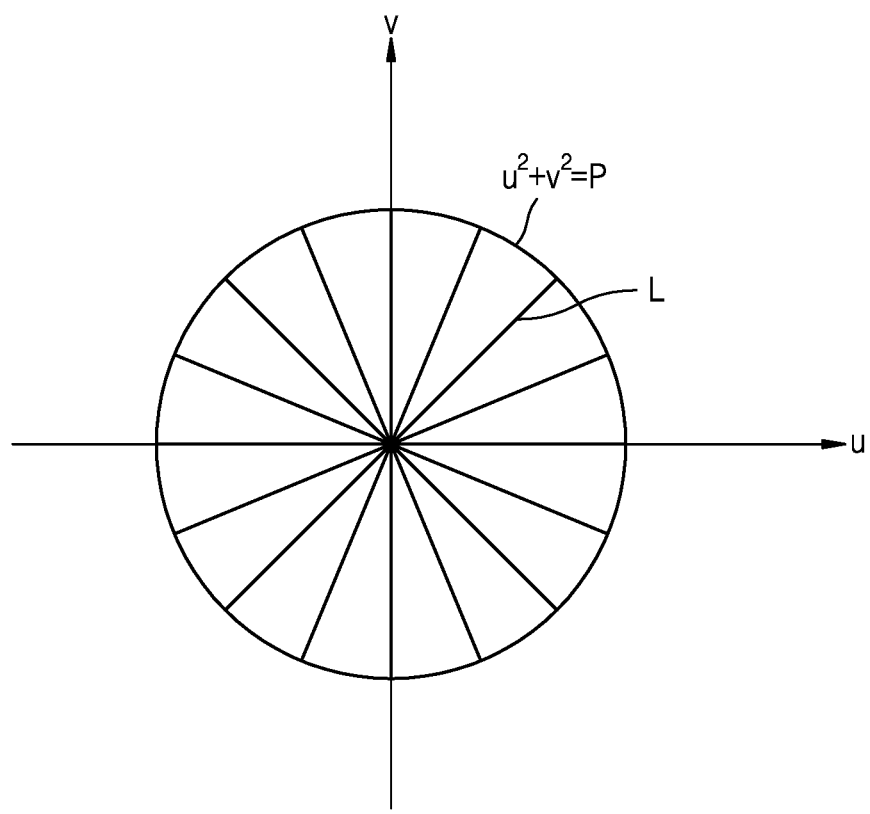
FIG. 8 is a diagram showing an example of forming a reference table by calculating period variables and light concentration effect correction terms by varying values of u and v on segments to be stored in the reference table.

FIG. 8 is a diagram showing an example of forming a reference table by calculating period variables and light concentration effect correction terms by varying values of u and v on segments to be stored in the reference table.

Referring to FIG. 8, a value of a period variable $u^2+v^2$ may increase as a distance to the point of origin increases. Therefore, the period variable $u^2+v^2$ may be changed to an arbitrary value between 0 and P by varying values of u and v with respect to a segment L interconnecting the point of origin and an arbitrary point satisfying $u^2+v^2=P$ on the circle. Therefore, if P has a value equal to $$\frac{2d_1 d_2 \lambda f}{d_1 f + d_2 f - d_1 d_2},$$

which is identical to size of a single period of a period variable, all values of the period variable for a reference table may be obtained by varying values of u and v with respect to the segment L. Furthermore, when the reference table is formed, an amount of data to be stored in the reference table may be reduced by varying values of u and v with respect to the segment L instead of varying values of u and v with respect to the entire space.

Referring to FIG. 5, the operation 220 may include an operation 224 for calculating the period variable at the coordinates of the pupil of the user corresponding to the first FFT calculation and an operation 226 for invoking a value of the light concentration effect correction term corresponding to a value of the period variable as calculated at the coordinates of the pupil of the user.

Hereinafter, referring to FIG. 9, a process by which the holographic image processing apparatus obtains a light concentration effect correction term by performing the operations 224 and 226 will be described.

Figure 9:
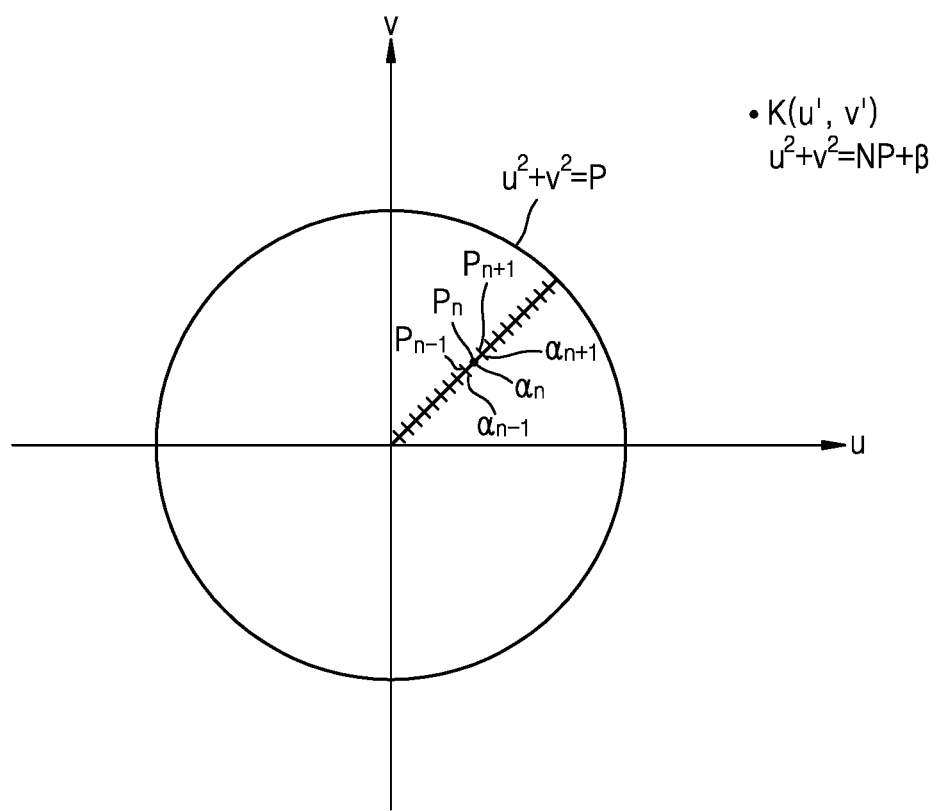
FIG. 9 is a diagram showing points with period variables and light concentration effect correction terms stored in a reference table and coordinates (u', v') of the pupil of the user corresponding to the first FFT calculation on a (u, v) plane.

FIG. 9 is a diagram showing points with period variables and light concentration effect correction terms stored in a reference table and coordinates (u', v') of the pupil of the user corresponding to the first FFT calculation on a (u, v) plane.

The holographic image processing apparatus may calculate a light concentration effect correction term corresponding to the coordinates (u', v') of the pupil of the user based on the first FFT calculation.

In operation 224, the holographic image processing apparatus may obtain a period variable at the coordinates (u', v') of the pupil of the user. Here, the period variable may have a value equal to $u'^2+v'^2$, for example.

In operation 226, the holographic image processing apparatus may search for a period variable corresponding to the period variable obtained at the coordinates (u', v') of the pupil of the user in a reference table. Here, the holographic image processing apparatus may obtain a remainder β by dividing the period variable $u'^2+v'^2$ as calculated at the coordinates (u', v') of the pupil of the user by the single period value $$P = \frac{2d_1 d_2 \lambda f}{d_1 f + d_2 f - d_1 d_2}.$$

Furthermore, the holographic image processing apparatus may search for a period variable $\alpha_n$ closest to the remainder β from among period variables stored in the reference table. Furthermore, the holographic image processing apparatus may invoke a light concentration effect correction term corresponding to the closest period variable $\alpha_n$.

The methods for performing a Fourier transformation according to exemplary embodiments have been described above with reference to FIGS. 1 to 9. Hereinafter, an apparatus configured to implement the methods for performing a Fourier transformation described above with reference to FIGS. 1 to 9 will be described.

Figure 10:
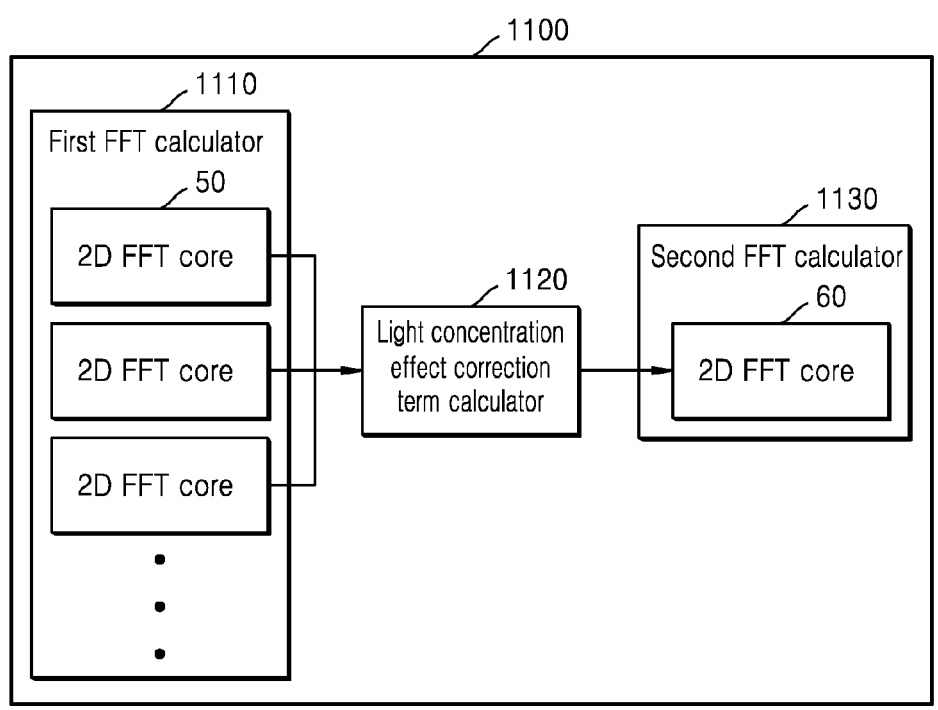
FIG. 10 is a block diagram for describing a holographic image processing apparatus 1100, according to another exemplary embodiment.

FIG. 10 is a block diagram for describing a holographic image processing apparatus 1100 according to another exemplary embodiment.

The holographic image processing apparatus 1100 shown in FIG. 10 generates a CGH image by performing a CGH processing sequence with respect to an input image, and displays the generated CGH image as a holographic image that may be viewed by a user in a virtual 3D space. Here, the CGH processing may be defined as a series of operations performed by the holographic image processing apparatus 1100 until a CGH image is generated. Furthermore, holographic images include still images and moving pictures reproduced as holograms.

A hologram is a 3D stereoscopic display technique for reproducing an object in a 3D space by adjusting an amplitude and a phase of light, thus featuring unlimited field of view and little stereoscopic fatigue. Therefore, many devices for embodying high-resolution holograms in real time by using complex spatial light modulators (SLMs) which are capable of simultaneously controlling the amplitude and the phase of light are being developed. A hologram may be displayed in a 3D space by using an interference pattern between an object beam and a reference beam. Recently, a CGH technique for providing a hologram on a flat panel display by processing an interference pattern for reproducing holographic moving pictures is being utilized.

According to a method for generating a digital hologram (e.g., a CGH technique), a hologram is generated by calculating an interference pattern generated by approximating optical signals and calculating an interference pattern generated via mathematical calculations. Based on the fact that a 3D object is formed of a set of 3D points, a method for generating a digital hologram produces a completed hologram by calculating point holograms corresponding to the respective 3D points constituting the 3D object.

Referring to FIG. 10, a Fourier transforming apparatus may include a first FFT calculator 1110 that generates first intermediate data by performing a first FFT calculation with respect to coordinates of a pupil of a user and with respect to input image data, a light concentration effect correction term calculator 1120 that calculates a light concentration effect correction term for correcting a light concentration effect occurring at the pupil of the user and generates second intermediate data by multiplying the first intermediate data by the light concentration effect correction term, and a second FFT calculator 1130 that performs a second FFT calculation regarding the coordinates of the pupil of the user with respect to the second intermediate data.

The first FFT calculator 1110 may perform a first FFT calculation with respect to a complex number function $F(x_2, y_2)$ obtained from input image data. The first FFT calculation may include a 2D Fourier transformation regarding coordinates $(x_2, y_2)$ of a retina of a user. To perform the 2D Fourier transformation, the first FFT calculator 1110 may include a plurality of 2D FFT cores 50.

The light concentration effect correction term calculator 1120 may calculate a light concentration effect correction term with respect to a single period of period variable values that periodically changes the light concentration effect correction term, and then form a reference table. Furthermore, the light concentration effect correction term calculator 1120 may calculate the period variable at the coordinates of a pupil of the user corresponding to the first FFT calculation, and may invoke the light concentration effect correction term corresponding to the value of the period variable calculated at the coordinates of the pupil of the user from the reference table.

The second FFT calculator 1130 may perform a 2D Fourier transformation regarding coordinates (u, v) of the pupil of the user with respect to second intermediate data. The second FFT calculator 1130 may include a single 2D FFT core 60, as shown in FIG. 10, or may include a plurality of 2D FFT cores.

A light concentration effect correction term calculator may calculate a light concentration effect correction term according to Equation 1 above. A period variable may be a nonlinear function of a horizontal coordinate u and a vertical coordinate v of the pupil of the user. For example, the period variable may be $u^2+v^2$.

The light concentration effect correction term calculator may calculate the period variables and the light concentration effect correction terms with respect to a straight line on a (u, v) plane by varying values of u and v, and store the period variables and the light concentration effect correction terms in the reference table.

The light concentration effect correction term calculator may obtain a remainder β by dividing the period variable calculated at the coordinates of the pupil of the user by the single period value, and invoke the light concentration effect correction term corresponding to a period variable closest to the remainder β from among the period variables stored in the reference table.

The period variable may be determined as being equal to $u'^2+v'^2$ at coordinates (u', v') corresponding to the first FFT calculation, whereas the light concentration effect correction term may be determined as being equal to $$\frac{2d_1 d_2 \lambda f}{d_1 f + d_2 f - d_1 d_2}.$$

The methods and apparatuses for Fourier transformation according to exemplary embodiments have been described above. According to the above-described exemplary embodiments, complicated complex number calculations for calculating a light concentration effect correction term during a Fourier transformation may be simplified by using a reference table. Furthermore, by greatly reducing a number of values to be stored in the reference table, memory resources for the reference table may be reduced.

The methods and apparatuses for Fourier transformation according to exemplary embodiments have been described above with reference to FIGS. 1 to 10. According to the above-described exemplary embodiments, during a Fourier transformation for generating a CGH image, amounts of calculations for calculating a light concentration effect correction term for correcting a light concentration effect occurring at a pupil of a user may be reduced.

Furthermore, a memory for calculating the light concentration effect correction term may be reduced.

The device described herein may comprise a processor, a memory for storing program data and executing it, a permanent storage unit such as a disk drive, a communications port for handling communications with external devices, and/or user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., read-only memory (ROM), floppy disks, hard disks, etc.), and optical recording media (e.g., compact disk ROMs (CD-ROMs), or digital versatile disks (DVDs)). The computer readable recording medium can also be distributed over network coupled computer systems so that the computer readable code is stored and executed in a distributed fashion. This media can be read by the computer, stored in the memory, and executed by the processor.

The exemplary embodiments may be described in terms of functional block components and various processing steps. Such functional blocks may be realized by any number of hardware and/or software components configured to perform the specified functions. For example, the exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, one or more exemplary embodiments may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the exemplary embodiments could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the exemplary embodiments unless the element is specifically described as "essential" or "critical".

The use of the terms "a" and "an" and "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The exemplary embodiments are not limited to the described order of the steps. The use of any and all examples, or exemplary language (e.g., "such as") provided herein, is intended merely to better illuminate the present disclosure and does not pose a limitation on the scope of the present disclosure unless otherwise claimed. Numerous modifications and adaptations will be readily apparent to one of ordinary skill in the art without departing from the spirit and scope of the present disclosure.

What is claimed is:

1. A method for performing a Fourier transformation for generating a computer-generated holographic (CGH) image, the method comprising:

generating first intermediate data by performing a first fast Fourier transform (FFT) calculation that relates to coordinates of a retina of a user with respect to input image data;

generating second intermediate data by calculating a light concentration effect correction term for correcting a light concentration effect occurring at a pupil of the user and multiplying the first intermediate data by the calculated light concentration effect correction term;

performing a second FFT calculation that relates to the coordinates of the pupil of the user with respect to the second intermediate data; and using a result of the performing the second FFT calculation to generate a displayable CGH image, wherein the generating the second intermediate data comprises:

forming a reference table by calculating the light concentration effect correction term with respect to a single period of at least one variable that has a regular periodicity;

calculating at least one respective value of each of the at least one variable at the coordinates of the pupil of the user based on the first FFT calculation; and invoking the light concentration effect correction term value corresponding to the calculated at least one respective value of each of the at least one variable.

2. The method of claim 1, wherein the light concentration effect correction term value varies based on the coordinates of the pupil of the user.

3. The method of claim 1, wherein the light concentration effect correction term value is determined by applying a first equation as follows:

$$C(u, v) = e^{-j\frac{\pi}{\lambda}\left(\frac{1}{d_1}+\frac{1}{d_2}-\frac{1}{f}\right)(u^2+v^2)}$$

wherein u denotes a horizontal coordinate of the pupil of the user, v denotes a vertical coordinate of the pupil of the user, C(u, v) denotes a light concentration effect correction term, λ denotes a wavelength of light, $d_1$ denotes a distance between a holographic display apparatus and the pupil of the user, $d_2$ denotes a distance between the holographic display apparatus and the retina of the user, and f denotes a focal length of a lens inside the holographic display apparatus.

4. The method of claim 3, wherein the at least one variable corresponds to a nonlinear function of the horizontal coordinate u of the pupil and the vertical coordinate v of the pupil.

5. The method of claim 4, wherein the at least one variable is expressible as $u^2+v^2$.

6. The method of claim 1, wherein, in the forming the reference table, each of the at least one respective value of each of the at least one variable and the light concentration effect correction terms are calculated with respect to a straight line on a (u, v) plane by varying values of u and v, wherein u denotes a horizontal coordinate of the pupil of the user, and v denotes a vertical coordinate of the pupil of the user; and each of the at least one respective value of each of the at least one variable and the light concentration effect correction terms are stored in the reference table.

7. The method of claim 6, wherein, in the forming the reference table, each of the at least one respective value of each of the at least one variable and the light concentration effect correction terms are calculated with respect to a segment interconnecting a point of origin and an arbitrary point satisfying $$u^2 + v^2 = \frac{2d_1 d_2 \lambda f}{d_1 f + d_2 f - d_1 d_2}$$

on a (u, v) plane by varying values of u and v and are stored in the reference table.

8. The method of claim 1, wherein, in the invoking the light concentration effect correction term, a remainder is obtained by dividing the calculated value of each of the at least one variable by a value that corresponds to the single period of the at least one variable, and the light concentration effect correction term corresponding to a value of the at least one variable closest to the remainder from among the at least one respective value of each of the at least one variable stored in the reference table is invoked.

9. The method of claim 8, wherein the at least one variable is expressible as $u'^2+v'^2$ at the coordinates (u', v') of the pupil of the user corresponding to the first FFT calculation, and the value that corresponds to the single period of the at least one variable is determined as being equal to $$\frac{2d_1 d_2 \lambda f}{d_1 f + d_2 f - d_1 d_2},$$

wherein u' denotes a horizontal coordinate corresponding to a first FFT calculation, v' denotes a vertical coordinate corresponding to a first FFT calculation, λ denotes a wavelength of light, $d_1$ denotes a distance between a holographic display apparatus and the pupil of the user, $d_2$ denotes a distance between the holographic display apparatus and the retina of the user, and f denotes a focal length of a lens inside the holographic display apparatus.

10. A non-transitory computer readable recording medium having recorded thereon a computer program for implementing the method of claim 1.

11. An apparatus for performing a Fourier transformation for generating a computer-generated holographic (CGH) image, the apparatus comprising:

a first fast Fourier transform (FFT) calculator which is implemented by at least one processor and configured to generate first intermediate data by performing a first FFT calculation that relates to coordinates of a retina of a user with respect to input image data;

a light concentration effect correction term calculator which is implemented by the at least one processor and configured to generate second intermediate data by calculating a light concentration effect correction term for correcting a light concentration effect occurring at a pupil of the user and multiplying the first intermediate data by the calculated light concentration effect correction term; and a second FFT calculator which is implemented by at least one processor and configured to perform a second FFT calculation that relates to the coordinates of the pupil of the user with respect to the second intermediate data; and a first processor from among the at least one processor configured to use a result of the performing the second FFT calculation to generate a displayable CGH image, wherein the second FFT calculator is further configured to form a reference table by calculating the light concentration effect correction term with respect to a single period of at least one variable that has a regular periodicity, to calculate at least one respective value of each of the at least one variable at the coordinates of the pupil of the user based on the first FFT calculation, and to invoke the light concentration effect correction term value corresponding to the calculated at least one respective value of each of the at least one variable.

12. The apparatus of claim 11, wherein the light concentration effect correction term value varies based on the coordinates of the pupil of the user.

13. The apparatus of claim 11, wherein the light concentration effect correction term value is determined by applying a first equation as follows:

$$C(u, v) = e^{-j\frac{\pi}{\lambda}\left(\frac{1}{d_1}+\frac{1}{d_2}-\frac{1}{f}\right)(u^2+v^2)}$$

wherein u denotes a horizontal coordinate of the pupil of the user, v denotes a vertical coordinate of the pupil of the user, C(u, v) denotes a light concentration effect correction term, λ denotes a wavelength of light, $d_1$ denotes a distance between a holographic display apparatus and the pupil of the user, $d_2$ denotes a distance between the holographic display apparatus and the retina of the user, and f denotes a focal length of a lens inside the holographic display apparatus.

14. The apparatus of claim 13, wherein the at least one variable corresponds to a nonlinear function of the horizontal coordinate u of the pupil and the vertical coordinate v of the pupil.

15. The apparatus of claim 14, wherein the at least one variable is expressible as $u^2+v^2$.

16. The apparatus of claim 11, wherein the light concentration effect correction term calculator is further configured to calculate each of the at least one respective value of each of the at least one variable and the light concentration effect correction terms with respect to a straight line on a (u, v) plane by varying values of u and v, wherein u denotes a horizontal coordinate of the pupil of the user, and v denotes a vertical coordinate of the pupil of the user, and to store each of the at least one respective value of each of the at least one variable and the light concentration effect correction terms in the reference table.

17. The apparatus of claim 16, wherein the light concentration effect correction term calculator is further configured to calculate each of the at least one respective value of each of the at least one variable and the light concentration effect correction terms with respect to a segment interconnecting a point of origin and an arbitrary point satisfying $$u^2 + v^2 = \frac{2d_1 d_2 \lambda f}{d_1 f + d_2 f - d_1 d_2}$$

on a (u, v) plane by varying values of u and v, and to store each of the at least one respective value of each of the at least one variable and the light concentration effect correction terms in the reference table.

18. The apparatus of claim 11, wherein the light concentration effect correction term calculator is further configured to obtain a remainder by dividing the calculated value of each of the at least one variable by a value that corresponds to the single period of the at least one variable, and to invoke the light concentration effect correction term corresponding to a value of the at least one variable closest to the remainder from among the at least one respective value of each of the at least one variable stored in the reference table.

19. The apparatus of claim 18, wherein the at least one variable is expressible as $u'^2+v'^2$ at the coordinates (u', v') of the pupil of the user corresponding to the first FFT calculation, and the value that corresponds to the single period of the at least one variable is determined as being equal to $$\frac{2d_1 d_2 \lambda f}{d_1 f + d_2 f - d_1 d_2},$$

wherein u' denotes a horizontal coordinate corresponding to a first FFT calculation, v' denotes a vertical coordinate corresponding to a first FFT calculation, λ denotes a wavelength of light, $d_1$ denotes a distance between a holographic display apparatus and the pupil of the user, $d_2$ denotes a distance between the holographic display apparatus and the retina of the user, and f denotes a focal length of a lens inside the holographic display apparatus.

20. A method for performing a Fourier transformation for generating a computer-generated holographic (CGH) image, the method comprising:

generating first data by performing a first fast Fourier transform (FFT) calculation that relates to coordinates of a retina of a user with respect to input image data;

generating second data by determining a light concentration effect correction term for correcting a light concentration effect occurring at a pupil of the user and multiplying the first data by the light concentration effect correction term;

performing a second FFT calculation that relates to the coordinates of the pupil of the user with respect to the second data; and using a result of the performing the second FFT calculation to generate a displayable CGH image, wherein the generating the second data comprises:

forming a reference table by determining the light concentration effect correction term with respect to a single period of at least one variable that has a regular periodicity; and determining at least one respective value of each of the at least one variable at the coordinates of the pupil of the user based on the first FFT calculation.

* * * * *